US011791991B2

(12) United States Patent
Mistry et al.

(10) Patent No.: US 11,791,991 B2
(45) Date of Patent: Oct. 17, 2023

(54) KEY MANAGEMENT FOR ENCRYPTED DATA

(71) Applicant: Google LLC, Mountain View, CA (US)

(72) Inventors: Shaunak Mistry, Scotts Valley, CA (US); Adam Markowtiz, Santa Cruz, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/647,697

(22) Filed: Jan. 11, 2022

(65) Prior Publication Data
US 2022/0141006 A1 May 5, 2022

Related U.S. Application Data

(63) Continuation of application No. 16/597,265, filed on Oct. 9, 2019, now Pat. No. 11,233,631.

(51) Int. Cl.
H04L 9/08 (2006.01)
H04L 9/06 (2006.01)

(52) U.S. Cl.
CPC .......... H04L 9/0825 (2013.01); H04L 9/0618 (2013.01); H04L 9/085 (2013.01); H04L 9/0822 (2013.01); H04L 9/0894 (2013.01)

(58) Field of Classification Search
CPC ... H04L 9/0825; H04L 9/0618; H04L 9/0822; H04L 9/085; H04L 9/0894; H04L 67/568;
(Continued)

(56) References Cited

U.S. PATENT DOCUMENTS 6,014,444 A * 1/2000 Nakamura ............ H04L 9/0838
380/243
6,819,764 B1 * 11/2004 Shimizu ................ H04L 9/0625
380/37
(Continued)

FOREIGN PATENT DOCUMENTS

GB 2471282 A 12/2010

OTHER PUBLICATIONS

International Search Report for the related Application No. PCT/US2020/055125. dated Nov. 26, 2020.
(Continued)

Primary Examiner — J. Brant Murphy
(74) Attorney, Agent, or Firm — Honigman LLP; Brett A. Krueger

(57) ABSTRACT

Key management for encrypted data includes establishing a cache of key decryption keys and periodically evicting the keys from the cache. A pool of key encryption keys also is created and periodically, selected key encryption keys are removed from service. Notably, the rate of removal of the encryption keys differs from the rate of cache eviction for the decryption keys. Thereafter, clear data is encrypted with a cipher to produce cipher text, and the cipher is encrypted with a selected key encryption key from the pool. Finally, in response to an access request for the clear data, an attempt to locate in the cache a key decryption key for the encrypted cipher is made. If attempt fails, the key decryption key is retrieved from remote memory. Finally, the encrypted cipher is decrypted with the located key, and the cipher text decrypted to produce the clear data.

18 Claims, 2 Drawing Sheets

(58) Field of Classification Search
CPC ... H04L 63/0428; H04L 63/064; H04L 63/06; G06F 21/602; G06F 21/6218
See application file for complete search history.

(56) References Cited

U.S. PATENT DOCUMENTS

| | | | | |
|---|---|---|---|---|
| 9,037,870 | B1* | 5/2015 | Zheng | H04L 9/0891 |
| | | | | 380/42 |
| 9,530,011 | B2* | 12/2016 | French | H04L 9/3271 |
| 10,491,576 | B1* | 11/2019 | Pfannenschmidt | H04L 9/14 |
| 2011/0296201 | A1* | 12/2011 | Monclus | G06F 21/53 |
| | | | | 718/1 |
| 2011/0296202 | A1* | 12/2011 | Henry | G06F 9/30189 |
| | | | | 713/190 |
| 2012/0054444 | A1* | 3/2012 | Wang | G06F 16/27 |
| | | | | 711/E12.001 |
| 2012/0131354 | A1* | 5/2012 | French | H04L 9/3271 |
| | | | | 713/189 |
| 2012/0233472 | A1* | 9/2012 | Faraboschi | G06F 12/1466 |
| | | | | 713/193 |
| 2013/0173853 | A1* | 7/2013 | Ungureanu | G06F 12/122 |
| | | | | 711/135 |
| 2014/0258719 | A1* | 9/2014 | Cidon | G06F 21/6209 |
| | | | | 713/165 |
| 2016/0104011 | A1* | 4/2016 | Henry | H04L 9/0827 |
| | | | | 713/190 |
| 2017/0286698 | A1* | 10/2017 | Shetty | G06F 21/6218 |
| 2018/0101322 | A1* | 4/2018 | Cheriton | G06F 21/64 |
| 2018/0139188 | A1* | 5/2018 | Iyer | G06F 21/6209 |
| 2018/0287785 | A1* | 10/2018 | Pfannenschmidt | H04L 9/14 |
| 2018/0375838 | A1* | 12/2018 | Hersans | H04L 9/0894 |
| 2019/0081990 | A1* | 3/2019 | Roy | H04L 9/0891 |
| 2019/0097791 | A1* | 3/2019 | Hersans | G06F 12/123 |

OTHER PUBLICATIONS

June Blender: "AWS Encryption SOK: How to Decide if Data Key Caching Is Right for Your Application—AWS Security Blog", Aug. 7, 2017 (Aug. 7, 2017), XP055751835, Retrieved from the Internet: URL: https ://aws.amazon.com/blogs/security/aws-encryption-sdk-how-to-decide-if-data-key-caching-is-right-for-your-application/ retrieved on Nov. 18, 2020], the whole document, 4 pages.

* cited by examiner

KEY MANAGEMENT FOR ENCRYPTED DATA

CROSS REFERENCE TO RELATED APPLICATIONS

This U.S. patent application is a continuation of, and claims priority under 35 U.S.C. § 120 from, U.S. patent application Ser. No. 16/597,765, filed on Oct. 9, 2019. The disclosure of this prior application is considered part of the disclosure of this application and is hereby incorporated by reference in its entirety.

TECHNICAL FIELD

The present invention relates to the field of data security and more particularly to securing data in a data processing system.

BACKGROUND

In the field of data processing, data at rest refers to inactive data stored physically in any digital form including within a database, data warehouse, document including a spreadsheet, or digital archive or other persistent memory including that found within a mobile device. Data at rest may be compared to data in use and data in transit, thus defining three understood states of digital data. Like data in transit and data in use, data at rest also must be secured for view by unauthorized entities. To that end, data encryption is commonly used to protect data at rest. General encryption techniques employed for both data at rest and data in use include strong encryption methods such as advanced encryption standard (AES) or Rivest-Shamir-Adleman (RSA) and ensure that encrypted data remains encrypted when access controls such as usernames and password fail. Generally, cryptography is implemented on the database housing the data and on the physical storage where the databases are stored with data encryption keys updated on a regular basis while stored separately from the data.

General encryption of data, especially data at rest, is not without its challenges. In this regard, encryption of data at rest provides little protection against intrusions in which a malevolent actor gains remote privileged access to a running server in which the passphrase has already been entered. As well, if the applications that access the encrypted files or databases are not themselves secured, a malevolent actor penetrating one of the applications may then gain access to the data, whether encrypted or not. Even further, when full-disk encryption is enabled on a physical server, human intervention is required to manually input a passphrase into a console at time of startup. For database-level encryption, the passphrase must be entered at time of database startup. Thus, data security for data at rest requires more than mere encryption in place.

SUMMARY

Embodiments of the present disclosure address the deficiencies of the art in respect to securing data including both data at rest and data at use, and provide a novel and non-obvious method, system and computer program product for key management for encrypted data. The method includes first establishing a cache of key decryption keys in local memory of a host computing system and periodically evicting decryption keys. As well, the method includes creating in the local memory, a pool of key encryption keys and periodically removing from service as a key encryption key, selected ones of the key encryption keys in the pool. Of import, the rate at which the selected ones of the key encryption keys are removed from service differs from the rate at which the selected key decryption keys are evicted from the cache.

The method further includes encrypting clear data in the local memory with a cipher to produce cipher text, and then encrypting the cipher with a selected one of the key encryption keys in the pool. Subsequently a request to access the encrypted data is received. In response to the request, an attempt is made to locate in the cache, a key decryption key corresponding to the encrypted cipher. In the event that the key decryption key cannot be located in the cache, the key decryption key may then be retrieved from remote memory from over a computer communications network. But, in either case, the encrypted cipher is then decrypted using the located key decryption key. Finally, the cipher text is decrypted with the decrypted cipher in order to produce the clear data.

In one aspect of the embodiment, the key encryption key and the key decryption key are identical. As such, the cache and the pool may be a unified structure so that the key encryption key and the key decryption key are stored within the unified structure. The key encryption key is then annotated to indicate whether the key encryption key is in active service for use as a key encryption key, or whether the key encryption key is to be used strictly as a key decryption key and is not in active service as a key encryption key. In another aspect of the embodiment, the cache and the pool are separate structures.

In yet another aspect of the embodiment, the rate at which each one of the selected ones of the key encryption keys is removed from service depends upon a threshold number of bytes encrypted by each one of the selected ones of the key encryption keys such that each one of the selected ones of the key encryption keys is removed from service after having encrypted a number of bytes beyond the threshold number. Alternatively, the rate at which each one of the selected ones of the key encryption keys is removed from service depends upon a threshold number of uses such that each one of the selected ones of the key encryption keys is removed from service after having been used in an encryption operation beyond the threshold number. Finally, in even yet another aspect of the embodiment, for each cipher to be encrypted one of the key encryption keys in the pool in active service is selected on a random basis for use in encrypting the cipher.

In another embodiment of the disclosure, a key management data processing system for encrypted data is provided. The system includes a computer with memory and at least one processor and an encryption module. The encryption module includes computer program instructions executing in the memory of the computer. During execution, the encryption module establishes a cache of key decryption keys in local memory of the computer and periodically evicts ones of the decryption keys. As well, the computer program instructions create in the local memory, a pool of key encryption keys and periodically removes from service as a key encryption key, selected ones of the key encryption keys in the pool. Of import, a rate at which the selected ones of the key encryption keys are removed from service differs from a rate at which the selected ones of the of the key decryption keys are evicted from the cache.

The program instructions further encrypt clear data in the local memory with a cipher to produce cipher text, and encrypt the cipher with a selected one of the key encryption keys in the pool. Subsequently, the program instructions receive a request to access the encrypted data. Finally, the program instructions respond to the request by locating in the cache, a key decryption key corresponding to the encrypted cipher and if the key decryption key is unable to be located in the cache, retrieving the key decryption key from remote memory from over a computer communications network, decrypting the encrypted cipher with the located key decryption key, and decrypting the cipher text with the decrypted cipher to produce the clear data.

Additional aspects of the disclosure will be set forth in part in the description which follows, and in part will be obvious from the description, or may be learned by practice of the disclosure. The aspects of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DESCRIPTION OF DRAWINGS

The accompanying drawings, which are incorporated in and constitute part of this specification, illustrate embodiments of the disclosure and together with the description, serve to explain the principles of the disclosure. The embodiments illustrated herein are presently preferred, it being understood, however, that the disclosure is not limited to the precise arrangements and instrumentalities shown, wherein.

DETAILED DESCRIPTION

Embodiments of the disclosure provide for key management for encrypted data. In accordance with an embodiment of the disclosure, a pool of key encryption keys and a cache of key decryption keys are maintained so as to facilitate a rotating use of different encryption keys in the pool for enhanced security, while permitting ready access to recently used key decryption keys locally without requiring a remote retrieval of a required decryption key. The rate, however, of removing encryption keys in the pool in favor of new keys inserted into the pool differs from the eviction rate of the cache so as to avoid the ability of a malicious actor to correlate the two. Thereafter, clear text may be encrypted into cipher text using a cipher and the cipher itself may be encrypted using one of the keys in the pool before both are stored in connection with one another in a local database. In response to a request to retrieve the clear text from the database, an attempt is made to locate in the cache the requisite decryption key in order to decrypt the cipher. If none can be found in the cache, the decryption key is retrieved from remote key management and the cipher is then decrypted. Finally, the cipher is used to decrypt the cipher text and the clear text is returned to the requestor.

Figure 1:
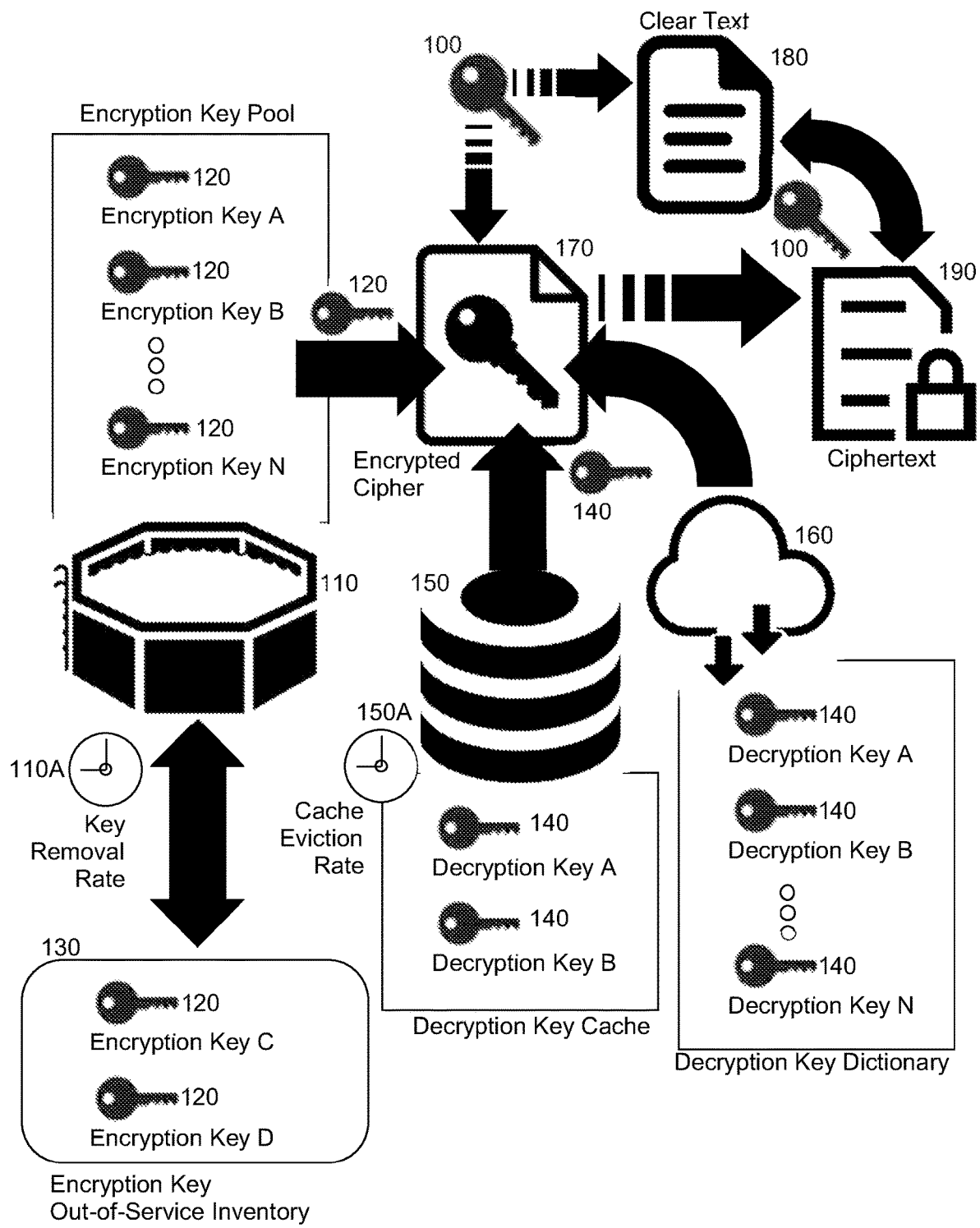
FIG. 1 is pictorial illustration of a process for key management for encrypted data.

In further illustration, FIG. 1 is pictorial illustration of a process for key management for encrypted data. As shown in FIG. 1, a key encryption key pool 110 is established into which different key encryption keys 120 are placed into service while a different selection of key encryption keys 120 remain in inventory 130 out-of-service. As a request is received to encrypt a cipher 100 used, in turn, in encrypting clear text 180 to produce cipher text 190, one of the key encryption keys 120 in the pool 110 may be selected to encrypt the cipher 100 to produce an encrypted cipher 170. In particular, one of the key encryption keys 120 may be selected on a random basis, or on a periodic basis according to a round-robin strategy in which each of the key encryption keys 120 in the pool 110 is reused only after each other of the key encryption keys 120 is used once, subsequently. Of note, the pool 110 is shown in FIG. 1 to be separate from the inventory 130, however, in one aspect of the embodiment, the pool 110 and inventory 130 may be combined into one data structure such that each entry in the structure includes meta-data indicating whether or not a corresponding one of the key encryption keys 120 is in-service in the pool 110 or out-of-service in the inventory 130.

Periodically, ones of the key encryption keys 120 in the pool 110 are removed from service and placed into inventory 130 as out-of-service according to a key removal rate 110A and replaced with ones of the key encryption keys 120 that are in the inventory 130 and out-of-service. In this regard, selected ones of the key encryption keys 120 may be removed from the pool 120 at the key removal rate 110A defined in accordance with a threshold number of uses of each key. Once the threshold number of uses in encrypting a cipher 100 has been surpassed, the selected one of the key encryption keys 120 is removed from the pool 110 into the inventory 130. Alternatively, selected ones of the key encryption keys 120 may be removed from the pool 120 at the key removal rate 110A defined in accordance with a threshold number of bytes encrypted by each key. Once the threshold number of encrypted bytes has been surpassed, the selected one of the key encryption keys 120 is removed from the pool 110 into the inventory 130.

As shown in FIG. 1, a decryption key cache 150 is established in which most recently used decryption keys 140 enabled to each decrypt a corresponding encrypted cipher 170 are stored. Optionally, each of the decryption keys 140 is identical to a corresponding one of the encryption keys 140 in the case of symmetric cryptography. Alternatively, each of the decryption keys 140 is asymmetrically related to a corresponding one of the encryption keys 120 in the case of asymmetric cryptography. In either circumstance, as in the case of the pool 110, periodically, individual ones of the decryption keys 140 are evicted from the decryption key cache 150 according to a cache eviction rate 150A. The cache eviction rate 150A may vary according to a cache eviction strategy such as least recently used or least frequently used, but in all cases the cache eviction rate 150A differs from the key removal rate 110A of the pool 110.

In any event, over time, different requests are received to retrieve clear text 180 from a local database that has been encrypted with a cipher 100, and that is stored as a combination of cipher text 190 and the encrypted cipher 180. In response to each request, the decryption cache 150 is first searched for the necessary one of the key decryption keys 140 enabled to decrypt the encrypted cipher 170 to produce the cipher 100 which in turn is enabled to decrypt the cipher text 190 into clear text 180. To the extent that the required one of the key decryption keys 140 cannot be found in the decryption key cache 150, the required one of the key decryption keys 140 can be retrieved from remote dictionary 160 from over a computer communications network. In any circumstance, once the required one of the key decryption keys 140 is located, whether in the decryption key cache 150 or in the remote dictionary 160, the encrypted cipher 170 is decrypted into the cipher 100 and the cipher text 190 is decrypted into the clear text 180 using the cipher 100.

Figure 2:
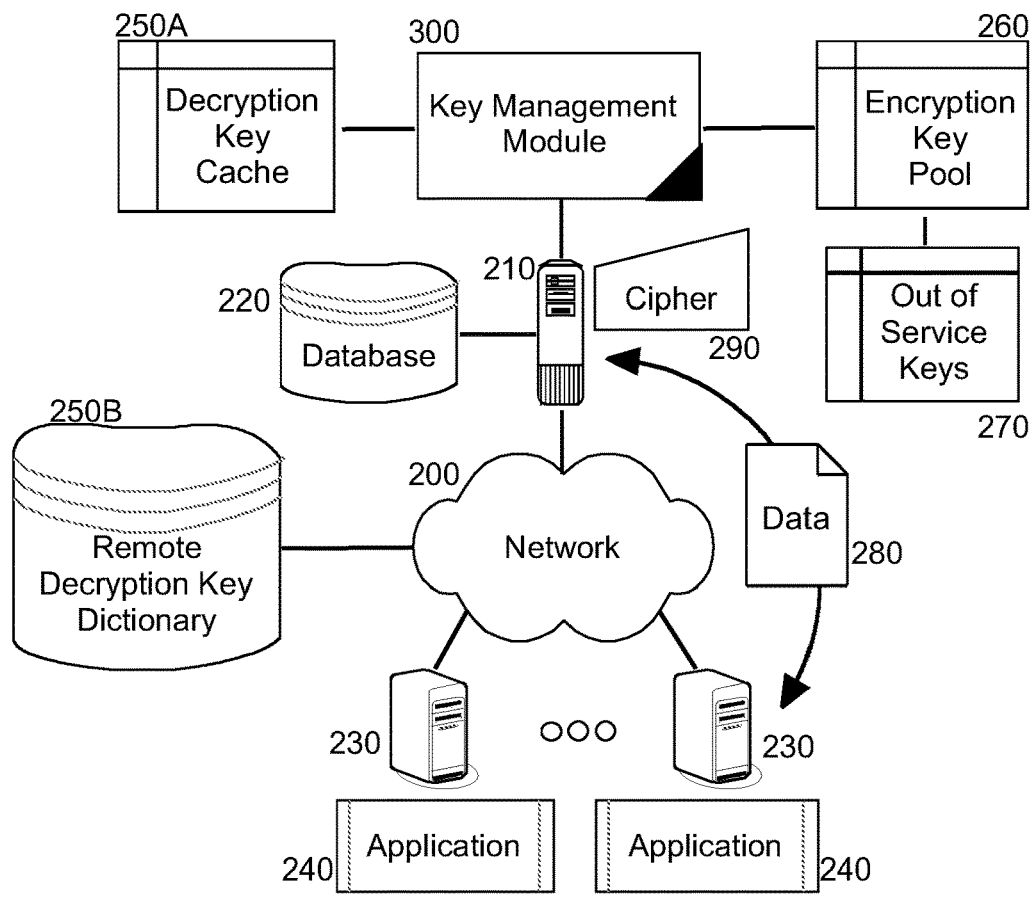
FIG. 2 is a schematic illustration of a data processing system configured for key management for encrypted data; and, FIG. 3 is a flow chart illustrating a process for key management for encrypted data.

The process set forth in connection with FIG. 1 may be implemented in a data processing system. In further illustration, FIG. 2 schematically shows a data processing system configured for key management for encrypted data. The system includes a host computing platform 210 that includes one or more computers, each with memory and at least one processor. The host computing platform 210 supports the execution of multiple different instances of a computer program 240, each of the instances securely accessing data 280 in a database 220 from over a computer communications network 200 utilizing in-place cryptography of data in the database 220. To that end, the host computing platform 210 additionally supports the operation of a key management module 300 with which encryption and decryption keys are managed in the encryption and decryption of one or more ciphers 290 used to encrypt and decrypt the data 280 to be stored and subsequently retrieved from the database 220.

In this regard, the key management module 300 includes computer program instructions that when executed by one or more processors of the host computing platform, is operable to establish a key encryption key pool 260 in which in-service ones of a set of key encryption keys are maintained for use on demand in encrypting ones of the ciphers 290 used to encrypt the data 280 before storing the data 280 as cipher text in the database 220. The program instructions additionally are operable to periodically remove ones of the key encryption keys in the pool 260 according to a removal rate and to place the removed key encryption keys in an out-of-service inventory 270 of key encryption keys and to replace the removed key encryption keys with others of the key encryption keys in the out-of-service inventory 270.

The program instructions further are operable to also create a decryption key cache 250A into which recently used key decryption keys are placed in connection with the decryption of corresponding ones of the ciphers 290 so as to permit the decryption of cipher text in the database 220 to produce the data 280 when requested by ones of the instances of the computer program 240. Of note, the cache eviction rate of the key decryption key cache 250A differs from the removal rate of the key encryption key pool 260. In operation, as a request is received from one of the instances of the computer program 240 to retrieve the data 280, the program instructions retrieve a combination of cipher text for the data 280 and an encrypted form of a corresponding one of the ciphers 290 used to generate the cipher text. The program instructions then attempt to locate the requisite key decryption key in the cache 250A which then may be used to decrypt the encrypted form of the corresponding one of the ciphers 290. However, in the event the program instructions are unable to locate the requisite key decryption key in the cache 250A, the program instructions retrieve the requisite key decryption key remotely from a remote dictionary 250B from over computer communications network 200. Once the corresponding one of the ciphers 290 has been decrypted using the requisite key decryption key, the corresponding one of the ciphers 290 is used to decrypt the cipher text into the data 290 to be returned as clear text to the requesting instance of the computer program 240.

Figure 3:
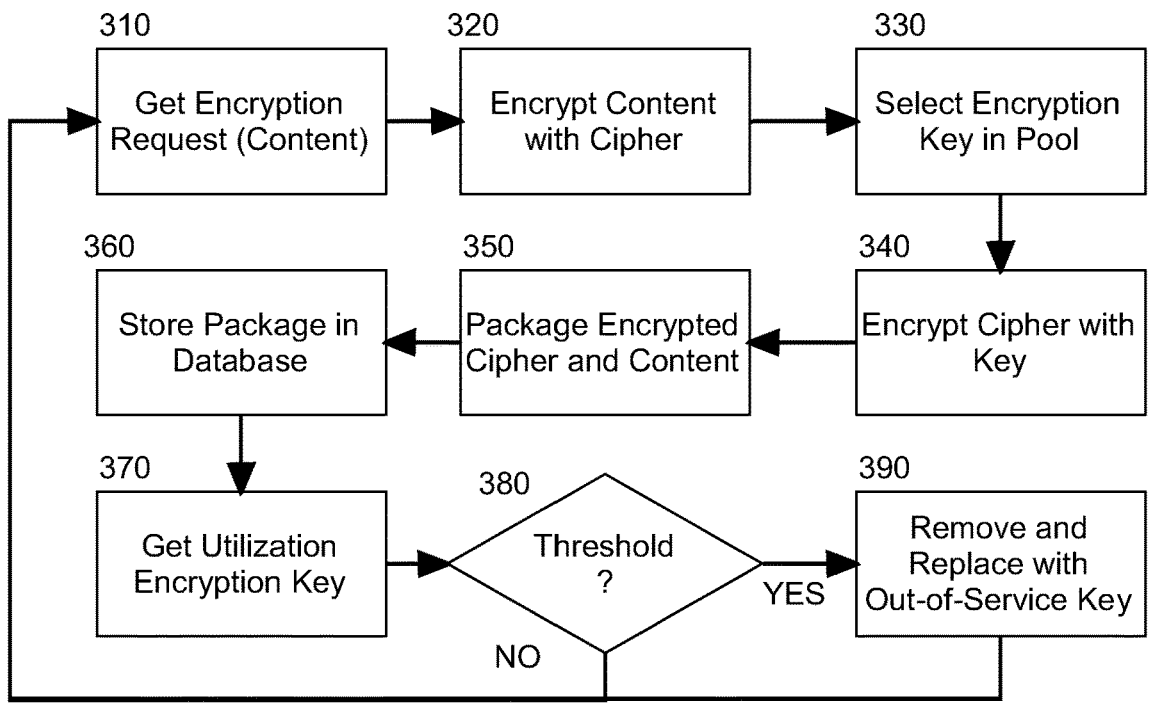

In even yet further illustration of the operation of the key management module 300, FIG. 3 is a flow chart illustrating a process for key management for encrypted data. Beginning at block 310, an encryption request is received in connection with content to be stored in a database and in block 320, the content is encrypted using a cipher so as to produce cipher text. In block 330, a key encryption key is selected from within the pool of key encryption keys and used to encrypt the cipher in block 340. Thereafter, in block 350, both the cipher text and the encrypted cipher are stored together in the database in block 360. In block 370, a utilization is then determined for the selected key encryption key.

In decision block 380, if the utilization exceeds a threshold value such as a number of uses of the selected key encryption key, or a selected number of bytes encrypted utilizing the key encryption key, then in block 390, the selected key encryption key is removed from the pool, placed into the out-of-service inventory and replaced with an out-of-service one key encryption key in the out-of-service inventory. As such, the periodic removal of such key encryption keys from the pool in response to requests to store data in the database defines a removal rate that differs from the cache eviction rate of the key decryption key cache in that the key decryption key cache evicts on the basis of least frequently used or least recently used basis in response to requests to retrieve data from the database. Because the removal rate differs at all times from the cache eviction rate, the correlation of key encryption keys to key decryption keys by a malicious actor can be thwarted.

The present disclosure may be embodied within a system, a method, a computer program product or any combination thereof. The computer program product may include a computer readable storage medium or media having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims as follows:

What is claimed is:

1. A computer-implemented method when executed by data processing hardware causes the data processing hardware to perform operations comprising:
   selecting, from an inventory of encryption keys comprising a set of encryption keys, a pool of encryption keys, the pool of encryption keys comprising a sub-set of the set of encryption keys;
   receiving a request to encrypt an object;
   selecting, from the pool of encryption keys, a first encryption key for encrypting the object;
   encrypting, using the selected first encryption key, the object;
   removing, from the pool of encryption keys, a second encryption key based on an encryption key removal rate;
   selecting, from the inventory of encryption keys, a replacement encryption key not currently within the pool of encryption keys; and
   placing the replacement encryption key into the pool of encryption keys,
   wherein the encryption key removal rate defines a threshold number of bytes encrypted for each encryption key within the pool of encryption keys.

2. The method of claim 1, wherein the encryption key removal rate defines a threshold number of uses for each encryption key within the pool of encryption keys.

3. The method of claim 1, wherein the first encryption key is randomly selected from the pool of encryption keys.

4. The method of claim 1, wherein the operations further comprise:
   receiving a second request to decrypt the object;
   determining whether a first decryption key is present within a cache of decryption keys, the first decryption key associated with the first encryption key;
   when the first decryption key is present within the cache of decryption keys, retrieving the first decryption key from the cache of decryption keys; and
   decrypting, using the first decryption key, the object.

5. The method of claim 4, wherein:
   the first decryption key is asymmetrically related to the first encryption key; or
   the first decryption key is the same as the first encryption key.

6. The method of claim 4, wherein the operations further comprise evicting, from the cache of decryption keys, a second decryption key based on a cache eviction rate, the cache eviction rate different from the encryption key removal rate.

7. The method of claim 6, wherein the evicted second decryption key represents a least recently used decryption key of the cache of decryption keys.

8. The method of claim 6, wherein the evicted second decryption key represents a least frequently used decryption key of the cache of decryption keys.

9. A computer-implemented method when executed by data processing hardware causes the data processing hardware to perform operations comprising:
   selecting, from an inventory of encryption keys comprising a set of encryption keys, a pool of encryption keys, the pool of encryption keys comprising a sub-set of the set of encryption keys;
   receiving a request to encrypt an object;
   selecting, from the pool of encryption keys, a first encryption key for encrypting the object;
   encrypting, using the selected first encryption key, the object;

removing, from the pool of encryption keys, a second encryption key based on an encryption key removal rate;

selecting, from the inventory of encryption keys, a replacement encryption key not currently within the pool of encryption keys; and placing the replacement encryption key into the pool of encryption keys, wherein the first encryption key is selected from the pool of encryption keys in a round-robin manner.

10. A system comprising:

data processing hardware; and memory hardware in communication with the data processing hardware, the memory hardware storing instructions that when executed on the data processing hardware cause the data processing hardware to perform operations comprising:

selecting, from an inventory of encryption keys comprising a set of encryption keys, a pool of encryption keys, the pool of encryption keys comprising a sub-set of the set of encryption keys;

receiving a request to encrypt an object;

selecting, from the pool of encryption keys, a first encryption key for encrypting the object;

encrypting, using the selected first encryption key, the object;

removing, from the pool of encryption keys, a second encryption key based on an encryption key removal rate;

selecting, from the inventory of encryption keys, a replacement encryption key not currently within the pool of encryption keys; and placing the replacement encryption key into the pool of encryption keys, wherein the encryption key removal rate defines a threshold number of bytes encrypted for each encryption key within the pool of encryption keys.

11. The system of claim 10, wherein the encryption key removal rate defines a threshold number of uses for each encryption key within the pool of encryption keys.

12. The system of claim 10, wherein the first encryption key is randomly selected from the pool of encryption keys.

13. The system of claim 10, wherein the operations further comprise:

receiving a second request to decrypt the object;

determining whether a first decryption key is present within a cache of decryption keys, the first decryption key associated with the first encryption key;

when the first decryption key is present within the cache of decryption keys, retrieving the first decryption key from the cache of decryption keys; and decrypting, using the first decryption key, the object.

14. The system of claim 13, wherein:

the first decryption key is asymmetrically related to the first encryption key; or the first decryption key is the same as the first encryption key.

15. The system of claim 13, wherein the operations further comprise evicting, from the cache of decryption keys, a second decryption key based on a cache eviction rate, the cache eviction rate different from the encryption key removal rate.

16. The system of claim 15, wherein the evicted second decryption key represents a least recently used decryption key of the cache of decryption keys.

17. The system of claim 15, wherein the evicted second decryption key represents a least frequently used decryption key of the cache of decryption keys.

18. A system comprising:

data processing hardware; and memory hardware in communication with the data processing hardware, the memory hardware storing instructions that when executed on the data processing hardware cause the data processing hardware to perform operations comprising:

selecting, from an inventory of encryption keys comprising a set of encryption keys, a pool of encryption keys, the pool of encryption keys comprising a sub-set of the set of encryption keys;

receiving a request to encrypt an object;

selecting, from the pool of encryption keys, a first encryption key for encrypting the object;

encrypting, using the selected first encryption key, the object;

removing, from the pool of encryption keys, a second encryption key based on an encryption key removal rate;

selecting, from the inventory of encryption keys, a replacement encryption key not currently within the pool of encryption keys; and placing the replacement encryption key into the pool of encryption keys, wherein the first encryption key is selected from the pool of encryption keys in a round-robin manner.

* * * * *